US005122727A

United States Patent [19]

Janssen et al.

[11] Patent Number: 5,122,727

[45] Date of Patent: Jun. 16, 1992

[54] ELECTRIC POWER SUPPLY SYSTEM WITH DISTRIBUTION OF OUTPUT

[75] Inventors: Rainer Janssen, Paderborn; Werner Kleffner; Hubert Meschede, both of Borchen, all of Fed. Rep. of Germany

[73] Assignee: Nixdorf Computer AG, Paderborn, Fed. Rep. of Germany

[21] Appl. No.: 429,197

[22] Filed: Oct. 30, 1989

[30] Foreign Application Priority Data

Oct. 31, 1988 [DE] Fed. Rep. of Germany ....... 3837071

[51] Int. Cl.[5] .......................... G05F 1/567; H02H 5/04

[52] U.S. Cl. .................................... 323/272; 323/907; 363/65; 361/18; 361/103; 307/491

[58] Field of Search ............... 323/269, 272, 366, 369, 323/907; 363/65, 71; 361/18, 103, 106; 307/64, 65, 52, 58, 59, 60, 62, 491

[56] References Cited

U.S. PATENT DOCUMENTS

| | | | |
|---|---|---|---|
| 4,675,770 | 6/1987 | Johansson | 361/18 |
| 4,720,758 | 1/1988 | Winslow | 361/18 X |
| 4,727,450 | 2/1988 | Fachinetti et al. | 361/18 X |
| 4,866,295 | 9/1989 | Leventis et al. | 323/907 X |
| 4,877,972 | 10/1989 | Sobhani et al. | 307/64 X |
| 4,935,864 | 6/1990 | Schmidt et al. | 323/907 X |

OTHER PUBLICATIONS

"Current-Mode control lets a power supply be paralleled for expansion, redundancy", Electronic Design, Nov. 14, 1985, pp. 125-128, 130 and 132.

"Spannungs-Experte", industrie-elektrik & elektronik, 1988, No. 3, pp. 54 and 55.

"Elektrische und Warmetechnische Messungen", Hartmann & Braun AG, 1963, 11th Edition, 185 and 189.

*Primary Examiner*—Steven L. Stephan
*Assistant Examiner*—Emanuel Todd Voeltz
*Attorney, Agent, or Firm*—Varnum, Riddering, Schmidt & Howlett

[57] ABSTRACT

An electric power supply system with at least two mains (10, 12, 14) is indicated, whose outputs (16, 18, 20) are switched in parallel and who together supply a load (22). The output power of the respective mains (10, 12, 14) is governed by its temperature. In a special execution the output power of the respective mains (10, 12, 14, is regulated by the difference of its temperature and the mean temperature of all mains. This results in the fact that the mean time between two failures of the electric power supply system is increased by simple means.

11 Claims, 2 Drawing Sheets

ELECTRIC POWER SUPPLY SYSTEM WITH DISTRIBUTION OF OUTPUT

TECHNICAL FIELD

The invention concerns an electric power supply system with at least two mains, whose power outputs are switched in parallel and together supply a load, whereby the power output of the respective mains is dependent on the total power output, as well as on the respectively allowed part of the total power.

BACKGROUND ART

For the power supply to high value electronic equipment such as computer or telecommunication installations, often two or more mains are switched in parallel to supply the equipment. If one of the mains fails, power is alternately supplied with the other mains. With this it is assured that the voltage or electric power supply of sensitive equipment goes without interruptions, even in critical working phases. Mains in this case are to be understood as electric power supply as well as voltage supply modules, whose primary energy is taken from an alternating or direct current source.

When power is provided by several parallel wired mains, two types of operation have to be distinguished. The first one is in normal operation to activate one main, which supplies the full power to the load, while the other mains are provided as power reserve and stay passive and are only switched on in case of a failure. In this case the active main is subjected to high demands, which increases the risk of failure. With the second operational possibility the power to the load is at the same time distributed over several mains, where the power distribution is divided up by a predetermined code. In general an even load for the mains is strived for. If by a defect, one of the mains breaks down, the power distribution is changed accordingly. This mode of operation has the advantage that the mains in normal operation are only burdened with a fraction of their nominal rating, by which load depending factors which could influence the functional ability of a mains have a small influence on the life of the mains.

Even though a power supply system for safety reasons is equipped with several mains, a dependability is only assured when all sub-assemblies work without faults. This means that if only one of the mains fails, the functional efficiency of the power supply system is limited and the defective mains have to be repaired or replaced with a new one. The mean time between two failures of a power supply system is, according to statistical analysis, directly dependent on the failure probability of each component, meaning the failure probability of dependability of the mains.

From reliability techniques, it is known that the mean time between two failures of mean utilization time of a mains will be shortened out of proportion by increasing the thermal load. The resulting maximum mean utilization time of an electric power supply system will be reached, due to the dependence of the failure probability of each of the individual mains, when the load on the individual mains in the average is at minimum. For this reason the above described second type of power supply system has a longer mean utilization time than the first mentioned one.

From these considerations, with known power supply systems, the total load is distributed over several mains. For this the total current, which sometimes can fluctuate considerably, will be determined and distributed to the mains by a certain ratio. If the mains only produce an output voltage, by dividing the current, the main power is divided in the same proportion. If, however, the mains produce, respectively, several output voltages, for each voltage a separate power distribution of the mains has to be effected, which makes the expenditure for controls very high.

By division of the total current to the parallel, switched mains, it is not yet assured that the power supply system has a small probability of failure, because for the thermal load important influence factors, such as lost power in the mains, converted to heat, the variation or the primary voltage, as well as the installation conditions of the mains, have not been taken under consideration. With unfavorable working conditions of the mains, for example caused by insufficient cooling, high ambient temperatures of different heat exchange resistance between the heat source and heat sink, it can occur that the mains with even power distribution are being utilized differently and as a consequence have a higher risk of failure. This can lead to a decrease of the average utilization time of the power supply system.

A power supply system with several mains, whose power output is switched parallel and which supplies a common load is known from the magazine Electronic Design, Nov. 14, 1985 pages 125 to 132. The output efficiency of the respective mains depends in this power distribution system on the total to the load giving output, which is provided by a reference voltage and on the other hand by a signal of current sensors with which the needed portion of the mains for the total power is determined. This power distribution system shows the before mentioned disadvantages.

It is also known from the magazine Industrie-elektrikelektronik 1988 No. 3, pages 54 to 55 to limit the output power of several switch regulators with different output voltages, when the appliance temperature exceeds a set limit value. The appliance (device) is being used to its thermal load limit and protected from thermal overload. The average utilization time of the power supply system will not be increased by this.

SUMMARY OF THE INVENTION

It is the purpose of the invention to increase the average time between two failures of the power supply system, employing simple means. This task for a power supply system as mentioned in the beginning will be solved by controlling the output power of the respective mains in addition to and dependent on the temperature.

The invention is based on the knowledge that the probability of failure of sub-assemblies increases exponentially. Special critical subassemblies in a power distribution system and pertinent mains are, for an example, power semiconductors and charging capacitors. If their temperature load is minimized, the life is respectively increased, which has a positive effect on the average utilization time and with that on the total power supply system. By including the temperature as a criterion for the distribution of power of each mains, the unwanted one-sided temperature load is avoided. This takes into consideration that temperature developed in one mains is less dependent on the output, but more dependent on the actual lost power of the mains, which due to fluctuations in manufacturing can vary with appliances of the same kind as well as from the environmental condition at the time.

The control of the power distribution can be done continuously or intermittently. In the last case, the deviation of the actual temperature of the mains will be determined in certain cycles and the output of the respective mains will be controlled accordingly. This is an advantage when digital control principles are employed.

If, in a power supply system, mains of the same type are switched in parallel, it comes to mind to control them to the same temperature values, because the dependence of the probability of failure of the respective sub-components of the temperature in the mains can be presumed. It is also possible to use mains of different types, which are distinguished because of their different nominal ratings or their heat loading ability. In this case the nominal temperature of the mains under consideration of the different risk of failure of the subcomponents can vary with temperature in the various mains.

A special benefit of the invention is in the small expenditure for controls by employing the power distribution with temperature dependence. Even by using mains with several output voltages, the expenditure does not have to be increased, because it is not necessary, as needed with state of the art systems, to determine the output at each respective output terminal, because with the temperature as a control unit, a parameter is used, where the lost power in the mains, via several output regulators is valued integral at the same time. A separate determination of power portions in reference to each output of the mains is not applicable any more.

A preferred execution of the invention is characterized by that the output of the respective mains will be regulated depending on the difference of its temperature and the mean temperature of all mains. In this form the average temperature of all mains is used for reference input for the control, meaning the power output of mains is controlled in such a way that the mains with the lowest temperature as the mean temperature have a higher output and, vice versa, the mains with higher temperature have a lower output. By this control principle, the mains want to assume an average temperature value, which for all on the load over a certain time period, given total load is a minimal value. By changing the mean time value of the total output, for example due to load changes or environmental conditions, or for example changed temperatures, a new mean temperature is automatically set. With this type of control, the overall effect is that after equalizing of the control differences all mains will have the same mean temperature. The sub-components of the mains have assumed approximately the same probability of failure, with that the utilization time of the power distribution system has been increased by a considerable degree.

In a purposeful execution of the invention it is planned, that in the respective mains, the temperature of at least one heat sink will be taken. The heat loss in a mains is normally dissipated to the surrounding via heat sinks. At the heat sink, a mean temperature level is achieved, which on one hand is determined by the source of heat, for example a power semiconductor, and on the other hand from environmental conditions such as installation condition of the mains.

A heat sink is very well suited to dissipate the characteristic temperature condition of the mains in a simple manner. With appliances (devices) with several output voltages, it is preferred to use a common heat sink for the power semiconductors. It is sufficient by registration of its temperature, to regulate the output of the total mains.

For temperature measurements, a current carrying temperature dependent resistor is preferable, whose voltage or current will be used as the measurement for the temperature. This simple type of temperature gathering is already sufficient to have power distribution, depending on the temperature, because it is not necessary for this to give the temperature of the mains in absolute values. Also, a linear connection between temperature and resistor is not required, because only the temperature differences are evaluated. Such temperature sensors are already existent in many mains to effect a switching off when overheating because of ventilator failure or missing cooling, and can be used for these measures.

A continuation of the invention is characterized by that the signal is produced according to the temperature of the respective main, which will be given out onto the collecting mains (ring mains) to which each mains is connected, and that the collecting mains in each mains is switched to negative ground via a reference resistor.

By this action, it is accomplished that a signal level is produced in the collecting mains, which as will be explained, corresponds to the mean temperature of all mains connected to the collecting mains. The signal level is independent of the number of mains, and is effected by the parallel switching of the reference resistors. Appropriately, a current signal is used for the signal, whose amplitude corresponds to the temperature of the respective mains. This applies to an electric power supply system, which consists only of a single mains, for the voltage U at reference resistor R with a temperature dependent current with amplitude I, giving the simple equation $U=R\ I$. If an electric supply system is used with "n" mains, the signals $I1, I2, \ldots, In$ will be produced in the collecting mains. The total current comprising the sum of the individual currents of the collecting mains causes, on the n parallel switched reference resistors, which have a total resistance R/n, to assume a voltage drop $U=(I1+I2+\ldots+In)\ R/n$. This voltage drop corresponds to the mean temperature of all "mains", which as already mentioned can be used as a reference point for controlling the output voltage of the mains.

An advantageous further development of the invention is a control unit, which controls an output regulator, which adjusts the output power of the respective mains and that the control unit as rated value a nominal temperature corresponding signal, as actual value an actual temperature corresponding signal is applied to the mains.

Conventional mains contain an output regulator which holds constant at the output the desired values, for example voltage or current, independent of load changes. With a mains, whose output size is regulated for constant voltage, such an output regulator could consist of a longitudinal regulator, which compares the output voltage to a fixed set nominal voltage and at deviation readjusts the output voltage. If two small mains are switched parallel for the supply of a common load because of small internal resistors in the mains, very small voltage differences between the output voltage are needed to effect different current outputs and different distribution of power. This effect is utilized by the application of the invention, in which the regulator, which notes the rates to actual value deviation of the temperature, approaches the output regulation in such a way that it will change its output voltage and with that its power output. When, for example, the actual temperature is smaller than the nominal temperature of the mains, the output regulator is forced to give a higher voltage The result of this is that the output current of the mains goes up and with that the power lost becomes larger. This warms up the mains until the actual temperature equals the nominal temperature and until the adjustment cycle is finished. With higher actual temperatures than the nominal temperature, an adjustment in reverse order is started. This type of regulating can be used in any number of parallel switched mains. This principle is not limited to voltage regulated mains, but can be used as well for current regulated mains with the appropriate designed regulators.

In the development, it is provided that the voltage as nominal value of the reference resistor is applied and as actual value to the temperature corresponding voltage of the respective mains. As already described, the signal level of the collecting mains corresponds to the mean temperature of all mains. By this measure, a very simple control unit is created, where the "in the electric supply system contained" mains, after easing off of the control steps, will have the same temperature according to the total load.

The explained control principle can be realized to great advantage when the control unit has a P I regulator whose time constant (response) is larger than the time constant of the heat sink. By this step, it is assured that the closed control circle also in critical operation does not tend to oscillate.

A further execution of the invention can be built in such a way that for the controlling of the output voltage or the output current of the respective mains, a controllable reference voltage source is provided, which produces a nominal value whose voltage is within set limits and is adjustable by means of the control assembly. In conventional mains, reference voltage sources are use to give an exact predetermined nominal value on which the output size of the mains can be regulated. By using a controllable reference voltage source, whose voltage can be changed by the control assembly, an especially simple possibility is presented to control the output size of the mains and with it indirectly the quantity of heat generated in the same. With that, the actual temperature of the mains can be readjusted to predetermined values.

BRIEF DESCRIPTION OF THE DRAWINGS

The invention will now be described with reference to the drawings in which.

DETAILED DESCRIPTION

Figure 1:
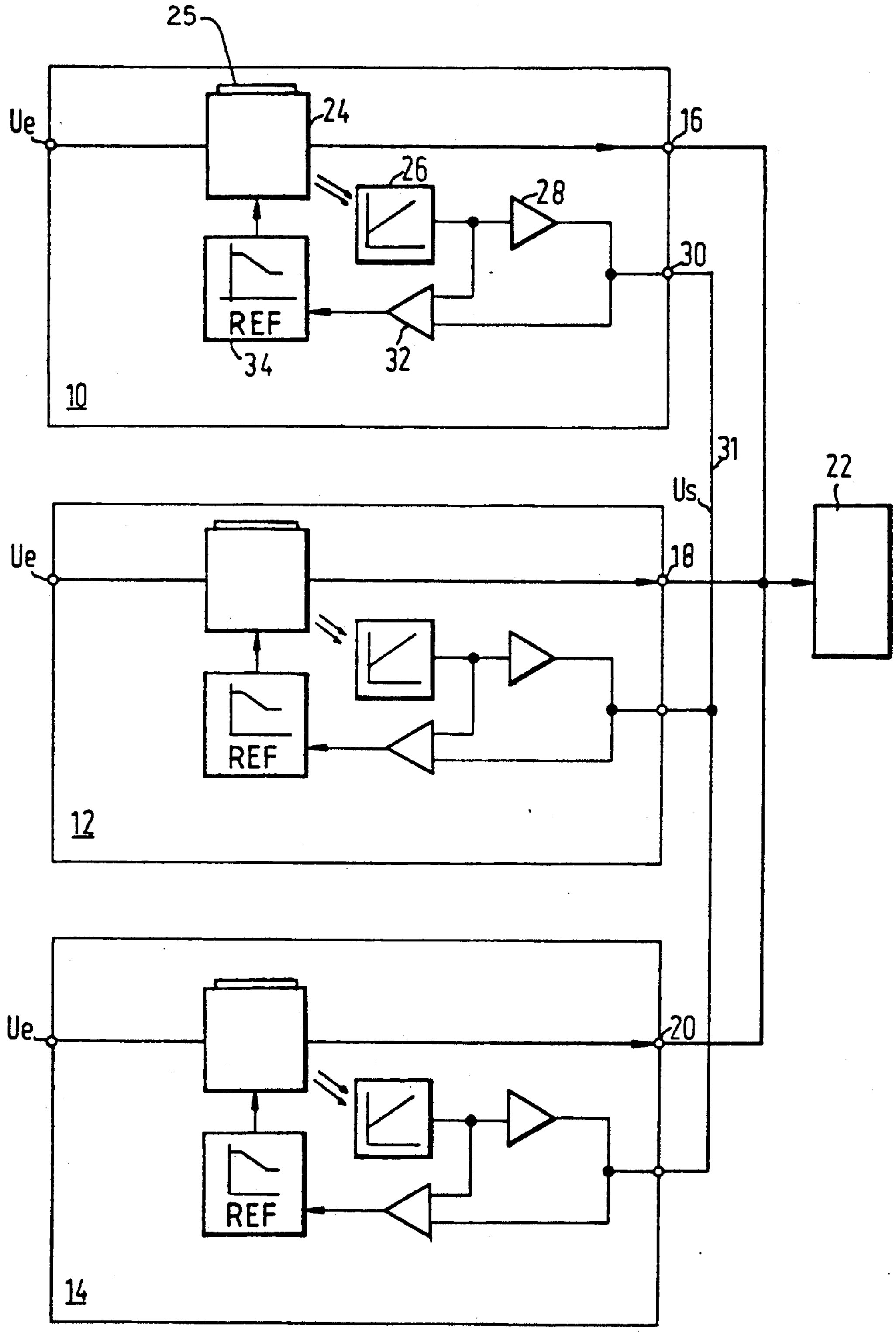
FIG. 1 is an electric supply system in block diagram form with three main with one common output.

In FIG. 1 is shown an electric power distribution system which consist of three similarly built mains 10, 12, 14, whose outputs 16, 18, 20, are connected to each other and feed a load 22. The load 22 can consist of one or several electric appliances. However, such an electric power supply system is especially suited for applications of high dependability, for example in the area of data processing or telecommunications.

The mains 10, 12, 14 will be supplied at the marked inputs with an unregulated direct current Ue; it is also possible to use mains which can be connected directly to an alternating current supply line. The mains 10, 12, 14 are designed in such a way, that with failure of any of the mains, the remaining mains can produce the total output power for the load 22.

Because the mains 10, 12, 14 are set up in a similar way, in the following the mains 10 will be described in more detail. In the mains 10 an output regulator 24 is set up, which can be designed as a switch control regulator or as a longitudinal regulator. It produces from the unregulated direct current Ue a regulated voltage at output 16. The output regulator 24 can consist of several parallel switched power semiconductors, such as for example bi-polar transistors, freewheel diodes, uncoupling diodes or rectifier diodes which together are mounted on a heat sink. This will be heated by lost power of the power semiconductors and dissipates this heat to the surrounding. At the heat sink 25 after some time in which the leveling step of heat intake and heat loss have subsided, a temperature point is reached which is between the temperature of the power transistor and the ambient temperature. A temperature sensor 26 reads the temperature of the heat sink 25 and at the entrance of the amplifier 28 gives a signal which corresponds to the temperature. This will be noted at output (exit) 30 on a collecting main. As will be described, a signal Us is produced on the collecting main 31, whose level corresponds to the mean temperature of all mains 10, 12, 14 connected to the collecting main 31.

The signal Us will be located at the input of the control assembly 32, which compares the actual temperature at the output of the temperature sensor 26 to the signal Us. The signal Us corresponds in a technical sense to the nominal value, and the signal of the temperature sensor 26 corresponds to actual value. If the nominal and actual values differ, the control assembly 32 gives an output signal to a controllable reference voltage source 34, whose output signal again influences the output regulator 24, by means of a set nominal value. The output regulator 24 controls the output voltage at terminal 16, according to the nominal value.

For purposes of explaining the working mode of output regulator of mains 10, it is assumed that the level of the signal Us is larger than the level of the signal of the temperature sensor 26, meaning the temperature of the heat sink of the output regulator 24 is lower than the mean temperature of all mains. In order to equalize the nominal/actual difference, the dissipation of the output regulator 24 is increased. The control assembly 32 produces to that an output signal according to the noted nominal-actual value differences, which causes the controllable reference source 34 to give out a high nominal voltage. With that, a control process is triggered at output regular 24, which increases the output voltage at terminal 16. This leads at the same time to a current increase in the output regulator 24, by which also the exerted power, the product of voltage and current, is increased. The control mechanism is so sensitive that a very small increase in voltage can lead to large currents. Because of the increased power output the lost power of the mains 10 is also increased, but especially the lost power for the power semiconductors, by which the temperature of the heat sinks increases. The control process lasts so long until the nominal-actual value difference at the control assembly reaches zero. This is the case when the actual temperature of the mains equals the mean temperature of all mains. A higher actual temperature than the mean temperature of mains 10 sets off a control process, which works in the opposite direction.

Because the total electric power from the mains 10, 12, 14 being delivered in a given time period stays constant, a distribution change from one mains to another takes effect, as a consequence, to change the temperature of the other mains. The distribution of power to the different mains by the described control principle causes, after easing of the control process, an assumption of the mean temperature by all mains to take effect, with a given operational mode under inclusion of the given total power as well as environmental condition, and the lowest temperature possible is set.

The control range of the reference voltage source 34 is limited to a range which is set by the limit values of mains 10, for an example by the maximum power as well as by current and voltage limit values. The control process does not lead to overstepping of maximum allowable limit values.

Figure 2:
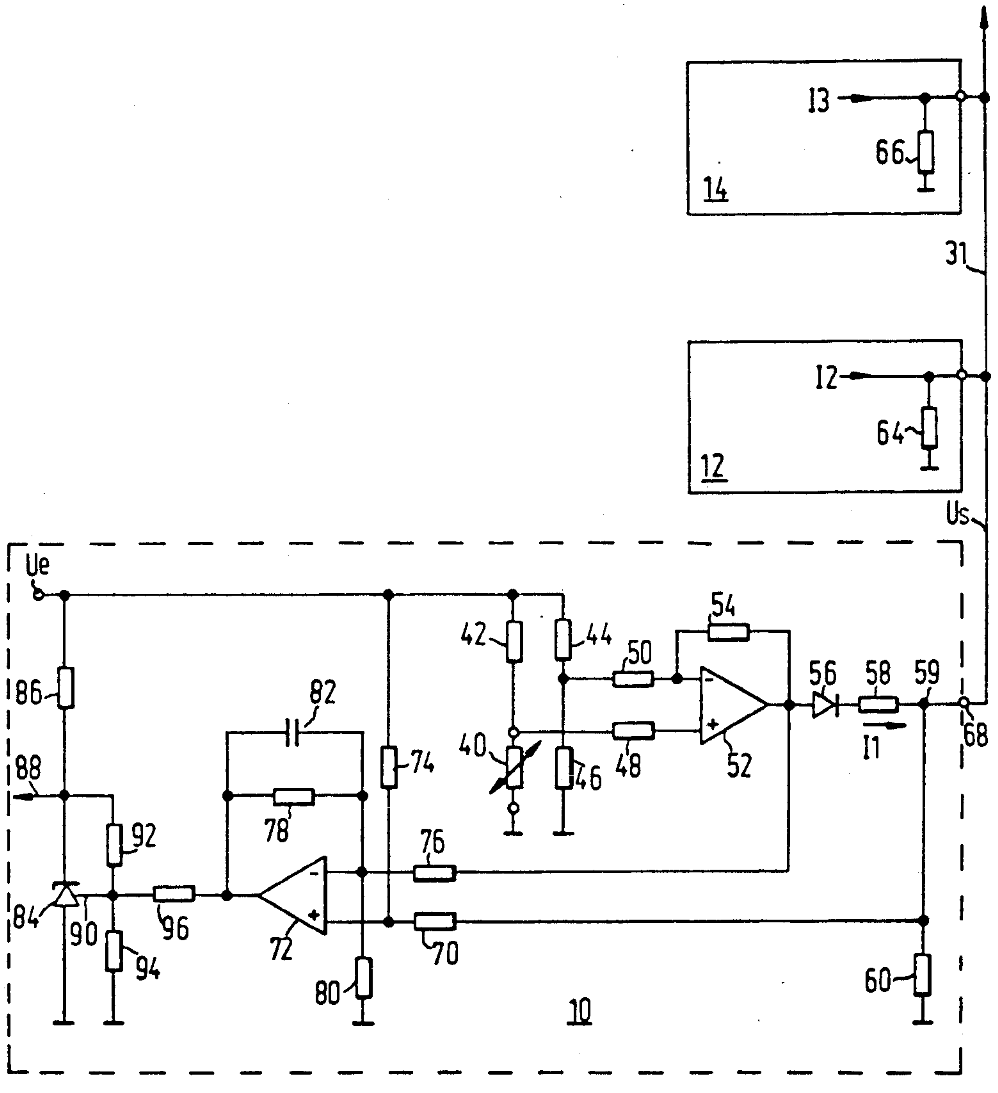
FIG. 2 is a switch arrangement for detecting the temperature in a mains as well as for controlling the output power.

The example shown in FIG. 2 of an electric power supply system can be expanded to mains, which produce several voltages. For this in the mains a respective number of output regulators like regulator 24 have to be provided. Normally the power semiconductors of these output regulators are mounted on a common heat sink, and the output regulator will be supplied from a single reference voltage source with the nominal values. In this case it is sufficient as already described to record the temperature of the heat sink and to regulate the reference voltage source independently from the nominal-actual value difference of the temperature. With this, power distribution with devices with several voltage outputs is possible without increase of expenditure for controls.

In FIG. 2 a more exact illustration shows a switching arrangement for the control of power of mains 10, depending on its temperature. Relevant parts of the mains 12, 14 are presented, on which the formation of the temperature will be explained. For more clarity, the output regulator 24 belonging to mains 10 has been omitted.

A temperature dependent resistor 40 is set up in a bridge circuit with resistors 42, 44, 46. It gathers the temperature of the heat sink (not shown) on the power semi-conductor of the output regulator 24. (See FIG. 1). The resistor 40 can also be located in other locations of mains 10, to produce a temperature which signal comes from mains 10. It is also possible to have several temperature sensors, which do not have to be temperature dependent resistors like resistor 40, in various locations of mains 10, and to evaluate their signals in such a way that the mean temperature characteristics for the mains is being determined.

The bridge circuit will be supplied from a controlled voltage Ue of the mains. Its diagonal voltage will, by way of resistors 48, 50, be led to an operational amplifier 52, which works as a differential amplifier and in its feedback branch has a resistor 54 for setting the amplification factor. The output voltage of the operational amplifier 52 produces a current I1, which flows through a decouple diode 56 and a resistor 58 and divides at intersection 59. A part of the current will be led through a reference resistor 60 of mains 10, and the other part flows over collecting main 31 and over parallel switched reference resistors 64, 66 of mains 12, 14 to ground. The reference resistors 60, 64, 66 each have the same value.

The temperature sensing in mains 12, 14, in which current I2 or I3 is produced, is accomplished the same way as in mains 10. In the following it will be shown that with this type of switching together, mains 10, 12, 14 by collecting main 31 will adjust to voltage Us, whose level corresponds to the mean temperature of all mains connected to the collecting main 31.

For better understanding, it is assumed that only the mains 10 is connected to the collecting main 31. Then through the resistor 60 the full current I1 flows, whose amplitude is dependent on the temperature gathered by way of resistor 40 of mains 10. The effective voltage drop Us by current I1 at reference resistor 60 is thus a measurement unit for the temperature of mains 10. If now, in addition, mains 12 is connected to the collecting main 31, the total resistance is reduced, with which the collecting main 31 is set against ground, because of the parallel switching of the reference resistors 64, 66 to half of their value. The sum of the current $I = I1 + I2$ is fed into the collecting main 31 and a voltage $Us = (I1 + I2)R/2$ is achieved in the collecting main 31, whereby R is the value of the reference resistor 60 or, respectively, 64. In general, for a number n of mains, which are switched together this way, a voltage Us is created on collecting main 31.

$$Us = (I1 + I2 + \ + In)R/n$$

The expression $(I1 + I2 + \ldots + In)\ R/n$ is an average building for n current, whereby the number n can be of any magnitude. This means that the voltage Us on the collecting mains 31 is independent from the number of connected mains and equals the mean temperature value of all mains.

By way of collecting main 31, each mains receives information about the mean temperature of all mains, which are used as reference inputs of variable nominal value for the control of the output power of the respective mains. In mains 10, the voltage Us will be led via a resistor 70 to the non-inverted inverted input of an operational amplifier 72. This input is by way of a resistor 74 also connected to the voltage Ub, by which a voltage drop at decoupling diode 56 is equalized and the operating point is adjusted at operational amplifier 72. The signal corresponding to the actual temperature of mains 10 at the output of operational amplifier 52 via a resistor 76 is applied to the inverted input of the operational amplifier 72. This as a variable gain amplifier is switched to PI (Proportional plus integral) control, whose amplifying factor will be adjusted by resistors 78 and 80. The time response of the variable gain amplifier 72 will be determined by the time constant in the feedback branch, which is established by condenser 82 and resistor 78. The time constant is set in such a way that it is greater than the thermal time constant of the heat sink of the output regulator. By this means, it will be avoided that the closed regulating circuit is oscillating.

A controllable reference voltage source 84 is switched behind the operational amplifier 72, connected via a resistor 86 with the supply voltage Ue. The reference voltage source 84 generates a nominal voltage 88 which is led to the voltage regulator, which compares the output voltage of mains 10 to the nominal voltage 88 and with deviation re-adjusts the output voltage accordingly. The reference voltage source 84 has a controllable input 90, over which the nominal voltage 88 can be changed, voltage controlled within tighter set limits. The resistors 92, 94 effecting a voltage division between nominal voltage 88 and the reference potential are used for the basic setting of the reference voltage source 84. The tap of this voltage divider is connected to the control input 90 and via a resistor 96 to the operational amplifier 72. In the following, the functional manner of the control assembly of mains 10 will be explained in three modes of operation.

In operational mode 1, let the actual temperature be the medium temperature, meaning the level of the output voltage of the operational amplifier 52 and the voltage Us are the same. Thus at the output of the operational amplifier 72 a certain voltage is present, caused by the loading of the condenser 82, by which the reference voltage source 84 will be set to a certain value. The then following switched output regulator controls the output voltage of mains 10 to a value, determined by nominal voltage 88, at which just so much lost power in mains 10 is produced that its temperature corresponds exactly to the mean temperature of all mains.

For a second operational mode it is assumed that the lost heat in the mains is so small that its actual temperature is lower than the medium temperature. In this case the operational amplifier will be controlled according to its time response, so that a more positive voltage is produced at its output, which increases to a small degree the nominal voltage 88 of reference voltage source 84. The voltage regulator approached by reference voltage 84 is induced to increase the output voltage by its value, where due to small internal resistance of the mains 10 already a small increase of voltage can increase the output current considerably. With this the power given to mains 10 is increased, which is the product of voltage and current, as well as the lost power of mains 10. By lost power (dissipation) the heat sink of the output regulator is warmed up. When its temperature has reached the mean temperature of all mains, the control process is finished.

The third operational mode is characterized by higher actual temperature, in comparison to the mean temperature. In this case the control process runs in the opposite direction to operational mode 2 as outlined. The examples shown in FIG. 1 and 2 of an electric power supply system are designed only for one output voltage. The here described principle as mentioned already can be utilized for an electric power supply system with several controlled output voltages or output currents, where a number of outputs have to be provided, depending on the number of output voltages or output currents. The nominal value can be derived from a single reference voltage source. When the power semiconductors of the different output regulators are mounted on a single heat sink, it is sufficient only to provide once a power regulation under consideration of FIG. 1 and FIG. 2, depending on the temperature.

We claim:

1. Electric power supply system with at least two mains, whose power outputs are switched in parallel and together supply a load, whereby the output power of the respective mains is set according to the power to be given to the load as well as a set partial of the total output is characterized by that the power output of the respective mains (10, 12, 14) will be regulated in addition and depending on its temperature.

2. System according to claim 1 characterized by that the power output of the respective mains (10, 12, 14) is regulated, dependent on the difference of its temperature and the mean temperature of all mains.

3. System according to claim 1 characterized by that in the respective mains CIO, 12, 14), the temperature is sensed of at least one heat sink.

4. System according to claim 1 characterized by that to sense temperature at least one electric current carrying, temperature dependent resistor (40) is provided for, whose voltage or electric current will be used as a measure for the temperature.

5. System according to claim 4 characterized by that a signal is created, dependent on the temperature of the respective mains (10, 12, 14), which will be given out on the collecting mains (ring mains), to which each mains (10, 12, 14) is connected and that the collecting mains (31) in each mains (10, 12, 14) over a reference resistor (60, 64, 66) is connected to ground.

6. System according to claim 5 characterized by that as a signal, a current signal (11, 12, 13, 14) is provided for, whose amplitude is dependent on the temperature.

7. System according to claim 1 characterized by that a control assembly (32, 72) is provided for, which controls an output regulator (24), which adjusts the power output of the respective mains (10) and that control assembly will receive a signal (Us) as a nominal value according to the nominal temperature and as an actual value according to the actual temperature of the respective mains (10).

8. System according to claim 7 characterized by that as the nominal value the voltage (Us) of the reference resistor (60) and as the actual value, the voltage corresponding to the temperature of the respective mains is delivered.

9. System according to claim 3 characterized by that the control assembly (32, 72) has a PI regulator, whose time constant is greater than the thermal time constant of the heat sink.

10. System according to claim 7 characterized by that for the control of the output voltage or the current output of the respective mains (10, 12, 14) a controllable reference voltage source is provided (34, 84) which produces a nominal value (88) and whose voltage (88) in set limits can be adjusted by the control assembly (32, 72).

11. System according to claim 1 characterized by that a mains with several output voltages or output currents which have a certain number of power regulators with output semiconductors is provided, and the output semiconductors are mounted together on the heat sink.

* * * * *